(12) United States Patent
Diderich

(10) Patent No.: US 8,715,806 B2
(45) Date of Patent: May 6, 2014

(54) FORMABLE PROTECTOR

(75) Inventor: Johannes Philippus Ludovicus Maria Diderich, Blauwestad (NL)

(73) Assignee: Hexacomb Corporation, Deerfield, IL (US)

( * ) Notice: Subject to any disclaimer, the term of this patent is extended or adjusted under 35 U.S.C. 154(b) by 614 days.

(21) Appl. No.: 12/907,962

(22) Filed: Oct. 19, 2010

(65) Prior Publication Data
US 2012/0094061 A1 Apr. 19, 2012

(51) Int. Cl.
B32B 3/12 (2006.01)
B32B 3/28 (2006.01)
B65D 81/05 (2006.01)
B65D 81/127 (2006.01)
B32B 33/00 (2006.01)

(52) U.S. Cl.
USPC ............ 428/116; 428/153; 428/218; 410/154

(58) Field of Classification Search
CPC .................. B32B 2553/023; B32B 2317/125; B32B 37/146; B32B 2305/024; B32B 2307/5825; B32B 29/002; B32B 2250/26
USPC .................. 428/116–121, 182, 218; 267/158; 160/84.05; 52/783.1, 793.1; 410/154; 229/87.01; 206/523, 586
See application file for complete search history.

(56) References Cited

U.S. PATENT DOCUMENTS

| | | | |
|---|---|---|---|
| 1,002,132 A | 8/1911 | Brown | |
| 2,704,587 A * | 3/1955 | Pajak | 428/118 |
| 2,761,553 A | 9/1956 | Wheeler | |
| 3,413,177 A | 11/1968 | Hoyt | |
| 3,587,479 A | 6/1971 | Geschwender | |
| 3,655,478 A | 4/1972 | Geschwender | |
| 3,982,057 A | 9/1976 | Briggs et al. | |
| 4,286,006 A * | 8/1981 | Boelter | 428/182 |
| 4,382,106 A * | 5/1983 | Royster | 428/40.1 |

(Continued)

FOREIGN PATENT DOCUMENTS

| | | |
|---|---|---|
| JP | 2003-072848 | 3/2003 |
| WO | WO98/28205 | 7/1998 |

(Continued)

OTHER PUBLICATIONS

International Search Report for International Application No. PCT/US2011/056873 mailed on May 24, 2012.

(Continued)

Primary Examiner — Callie Shosho
Assistant Examiner — Nicholas W Jordan
(74) Attorney, Agent, or Firm — Klarquist Sparkman, LLP

(57) ABSTRACT

A sandwich construction including a core having inner and outer surfaces and comprising a sheet material oriented extending between the inner and outer core surfaces in a configuration providing resistance to crushing in a direction between the inner and outer surfaces. The formable protector further includes an outer facing layer of a sheet material adhered to the outer surface of the core layer; and an inner facing layer adhered to the core inner surface and being sufficiently deformable to conform to a sharp edge of a protected object when the protector is bent therearound, and being substantially more compressible or stretchable than the outer facing layer. The core has sufficient resistance to crushing and the outer facing layer is sufficiently durable for causing the core to partially crush when the protector is bent around the sharp edge while partially retaining crushing resistance for protecting the sharp edge against impact.

18 Claims, 3 Drawing Sheets

(56) References Cited

U.S. PATENT DOCUMENTS

| | | | |
|---|---|---|---|
| 4,461,796 A | | 7/1984 | Fukahori et al. |
| 4,606,959 A | * | 8/1986 | Hillinger ............... 428/116 |
| 4,859,517 A | | 8/1989 | Hull |
| 5,000,372 A | | 3/1991 | Hollander et al. |
| 5,030,501 A | | 7/1991 | Colvin et al. |
| 5,175,041 A | | 12/1992 | Webb et al. |
| 5,511,667 A | | 4/1996 | Carder |
| 5,518,802 A | | 5/1996 | Colvin et al. |
| 5,540,972 A | | 7/1996 | Jaegers et al. |
| 5,544,473 A | | 8/1996 | Maida et al. |
| 5,667,871 A | | 9/1997 | Goodrich et al. |
| 5,688,578 A | | 11/1997 | Goodrich |
| 5,741,098 A | | 4/1998 | Letts, III |
| 5,782,735 A | | 7/1998 | Goodrich et al. |
| 5,804,030 A | | 9/1998 | Jaegers et al. |
| 5,894,044 A | | 4/1999 | Norcom et al. |
| 5,950,835 A | | 9/1999 | Moser et al. |
| 6,007,469 A | | 12/1999 | Jaegers et al. |
| 6,033,167 A | | 3/2000 | Bourgeois |
| 6,117,520 A | | 9/2000 | Wielinga |
| 6,139,938 A | * | 10/2000 | Lingle et al. ............... 428/182 |
| 6,372,322 B1 | | 4/2002 | Devaguptapu |
| 6,436,511 B1 | | 8/2002 | Ratzel |
| 6,468,646 B2 | | 10/2002 | Carson et al. |
| 7,288,164 B2 | | 10/2007 | Roberge et al. |
| 7,452,316 B2 | | 11/2008 | Cals et al. |
| 2002/0002811 A1 | * | 1/2002 | Weder et al. ............... 206/584 |
| 2002/0025404 A1 | | 2/2002 | Taber et al. |
| 2007/0148377 A1 | * | 6/2007 | Naito ............... 428/32.38 |
| 2008/0203635 A1 | * | 8/2008 | Hascalovich et al. ......... 267/148 |
| 2009/0068910 A1 | | 3/2009 | Fredrick et al. |
| 2012/0266568 A1 | | 10/2012 | Prud'homme et al. |

FOREIGN PATENT DOCUMENTS

| | | | |
|---|---|---|---|
| WO | WO 00/06374 | | 2/2000 |
| WO | WO01/26889 | | 4/2001 |
| WO | WO 01/94236 | | 12/2001 |
| WO | WO2008/037078 | | 4/2008 |
| WO | WO2009/045095 | | 4/2009 |
| WO | WO 2011075046 A1 | * | 6/2011 |

OTHER PUBLICATIONS

Written Opinion, PCT/CA2010/002015, 3pp. (Mar. 16, 2011).

* cited by examiner

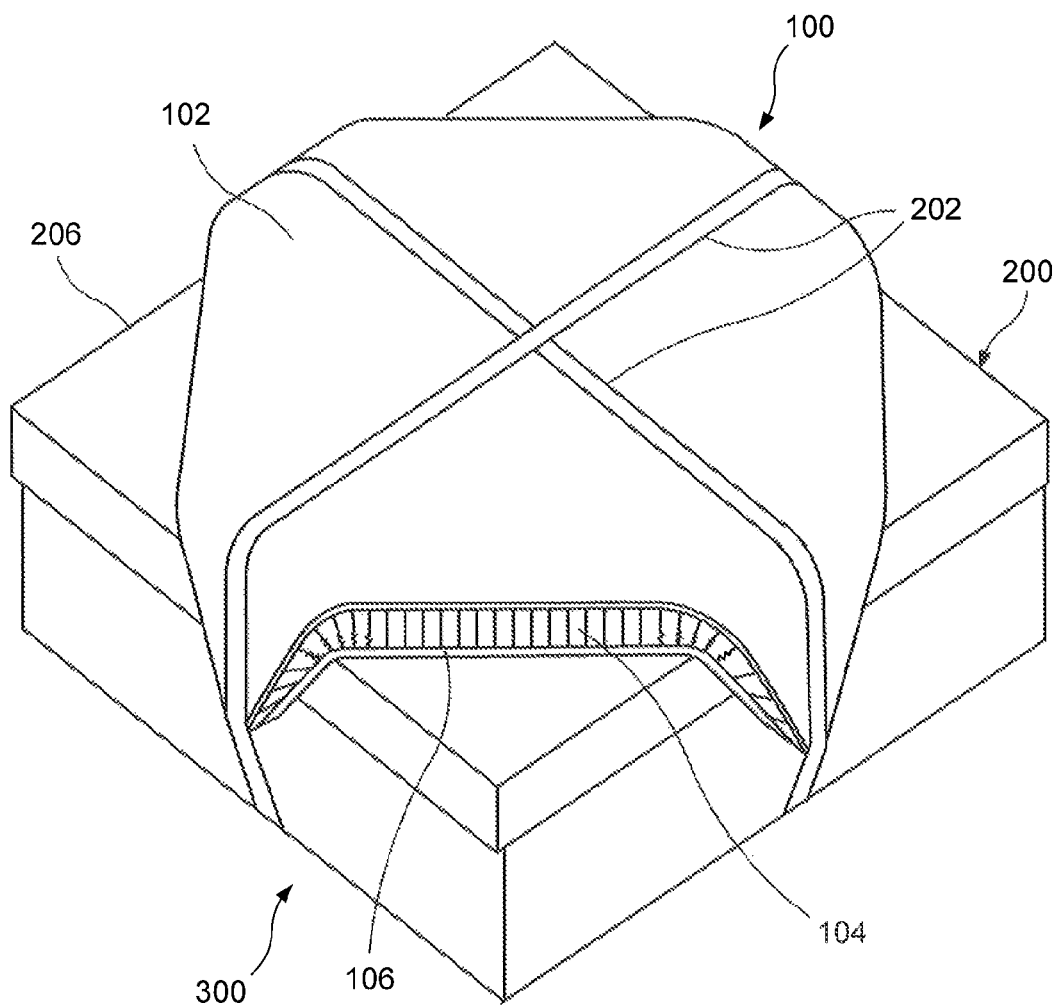
F I G. 4

FORMABLE PROTECTOR

TECHNICAL FIELD

The present disclosure relates generally to structures used for protecting products. The present disclosure more specifically relates to a formable protector that is able to conform around edges.

BACKGROUND

Many different materials are used for packaging objects. Widely used packing materials include bubble-wrap, Styrofoam™, air bladders, paper boards, etc. A paperboard configuration that is often used for shipping and/or retail applications include corrugated paperboards that are durable and readily machinable. Another widely used paperboard configuration includes a honeycomb core sandwiched between two paper sheets. Typically, the honeycomb core makes these types of paperboards very stiff, and difficult to bend. Further, bending these types of paperboards typically causes at least one, if not both, of the outer paper sheets to tear and rip and/or an inability of the paperboard to maintain its original shape. Accordingly, these types of paperboards are generally ill-suited to conform to shapes and features, such as sharp edges and the like.

Typically, honeycomb core paper boards typically require pre-fabricated features specifically designed for a specific shape in order to accommodate the various shapes and features of products for which they are being used to protect. These pre-fabricated features include grooves, slits, cuts, channels, etc. For example, U.S. Pat. No. 6,007,469 describes a honeycomb protector having slits and channels to allow the panels to be foldable. U.S. Pat. No. 5,511,667 and U.S. Pat. No. 5,175,041 describe honeycomb protectors having crush slit scores and slits with crushed beveled surfaces, respectively, in order to allow the panels to be folded. Further, U.S. Patent Publication No. 2002/0025404 describes a honeycomb protector having a V-shaped cut that permits folding of the protector. Although these pre-fabricated features permit honeycomb core protectors to be folded, they have several drawbacks. First, the various pre-fabricated features that allow the protectors to fold typically weaken the crush resistance of the honeycomb core. Further, the location of these features are pre-determined during manufacturing of the protector, and these features are specifically designed to allow the protector to only be folded in a specific manner to accommodate one particular shape.

SUMMARY

An exemplary embodiment of the present disclosure can provide a sandwich construction including a core having inner and outer surfaces. The core can include a sheet material oriented extending between the inner and outer core surfaces in a configuration providing resistance to crushing in a direction between the inner and outer surfaces. The formable protector can further include an outer facing layer of a substantially unstretchable sheet material adhered to the outer surface of the core layer; and an inner facing layer adhered to the core inner surface and being sufficiently deformable to conform to a sharp edge of a protected object when the protector is bent therearound. The core preferably has sufficient resistance to crushing and the outer facing layer is sufficiently durable for causing the core to partially crush when the protector is bent around the sharp edge while partially retaining crushing resistance for protecting the sharp edge against impact.

In some embodiments, the sandwich construction can be a formable protector, and the core sheet material can be configured in a two-dimensional pattern normal to the inner and outer surfaces. For example, the core sheet material can be arranged as a honeycomb structure or can be corrugated. Additionally, the sheet material of the core and/or the outer facing material can include paper sheet.

According to an exemplary embodiment of the formable protector, the outer facing layer can include a printable-clay coated paper and the inner facing layer can be sufficiently deformable for conforming to the core crushed about the sharp edge to at least half the core depth, or when the core is completely crushed about the sharp edge, without tearing. The inner facing layer can sufficiently compress or stretch in order to conform to the core without tearing.

According to an exemplary embodiment of the formable protector, the inner and outer facing layers can be substantially continuous. The inner facing layer can include wadded paper and/or a foam layer.

An exemplary embodiment of the present disclosure can provide a formable protector including a honeycomb core having inner and outer surfaces. The core may include a sheet material oriented extending between the inner and outer core surfaces in a configuration providing resistance to crushing in a direction between the inner and outer surfaces. The formable protector can further include an outer facing layer of a substantially unstretchable paper sheet material adhered to the outer surface of the core layer; and an inner facing layer adhered to the core inner surface and being sufficiently stretchable to conform to a sharp edge of a protected object when the protector is bent therearound. The core can have sufficient resistance to crushing and the outer facing layer is sufficiently durable for causing the core to partially crush when the protector is bend around the sharp edge while partially retaining crushing resistance for protecting the sharp edge against impact.

According to an exemplary embodiment of the formable protector, the inner and outer facing layers can be substantially continuous. Further, the inner facing layer can include wadded paper and/or a foam layer. The inner facing layer can also be sufficiently deformable for conforming to the core crushed about the sharp edge to at least half the core depth, or when the core is completely crushed about the sharp edge, without tearing.

BRIEF DESCRIPTION OF THE FIGURES

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 4 is a cross-sectional close up view of a formable protector in use in accordance with an exemplary embodiment of the present disclosure.

DETAILED DESCRIPTION

Figure 1:
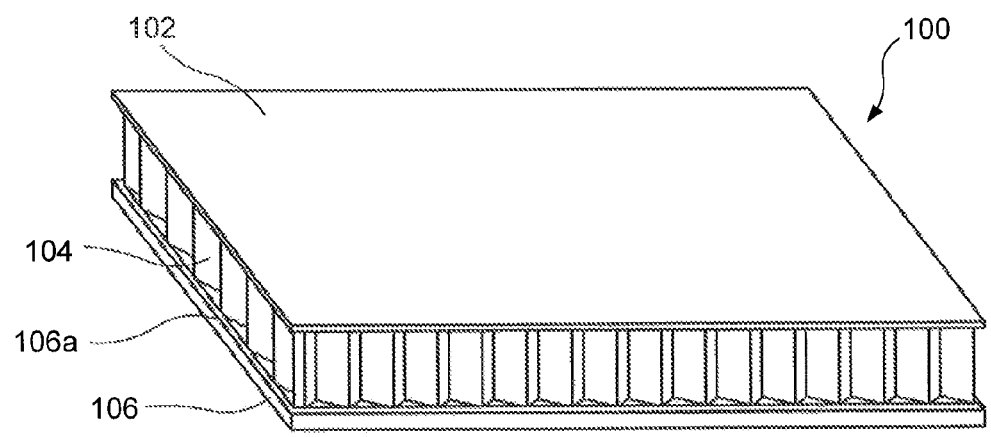
FIG. 1 is a perspective view of a formable protector construction in accordance with an exemplary embodiment of the present disclosure.

Referring to FIG. 1, a sandwich construction is shown. A preferred embodiment of the sandwich construction is a formable protector 100, which includes a core layer 104, and facing layers 102 and 106 affixed thereto, preferably by adhering to the core layer 104. The layers 102, 104, and 106 can have an adjacent, overlapping orientation as shown in FIG. 1. Preferably, the layers 102, 104, and 106 are coextensive and are affixed together to form the formable protector 100.

In exemplary embodiments, the formable protector has major surfaces, such as when viewed towards the outer facing 102, that is approximately 3'×3' or 6'×6', although other size and shape can be used. In embodiments having theses areas, the formable protector typically may have a thickness t1 between ½ inch to 1 inch thick. However, the formable protector may have any thickness. In alternative embodiments, the thickness t2 of the core layer 104 itself may be between about 0.1-10 inches, or preferably between about 0.2-6 inches, the thickness t3 of outer facing layer 102 may be between 0.004 and 0.016 inches, more preferably between 0.006 and 0.009 inches, and in one embodiment is 0.0075 inches, and the thickness t4 of the inner facing layer may be about 0.01-1 inch thick, and preferably 0.05-0.8 inches thick. It will be appreciated that any size and thickness t1, t2, t3, t4 may be used for the formable protector 100.

The outer facing layer 102 may be adhered to an outer surface of the core layer 104, and the inner facing layer 106 may be adhered to a inner surface of the core layer 104. Preferably, the outer facing layer 102 is made of a strong and durable material that is sufficiently flexible to allow the formable protector 100 to bend over and around shapes and features of an object that it is protecting, preferably without tearing, breaking or otherwise structurally failing. Compared to the inner facing 106, the outer facing layer 102 can be relatively unstretchable (e.g., in a direction parallel to the plane of the sheet). The outer facing layer 102 is preferably sufficiently strong and durable so that it can remain uniform and cause the core layer 104 to at least partially crush when the formable protector is bent around a sharp edge of an object. Preferably, the outer facing layer 102 is constructed to withstand tearing and ripping when the formable protector 100 is bent over the sharp object edge, and to substantially retain its structural integrity.

Outer facing layer 102 may provide some structural stiffness for the composite protector 100, and also may provide protection for the core layer 104 from being damaged. The outer facing layer 102 may be made from suitable sheet materials, such as fiber-based or reinforced materials, and/or monolayer or multilayer materials, and is preferably made from paper sheet. Synthetic or natural materials that provide sufficient tensile strength and bending flexibility for the outer facing layer 102 may be used. In an embodiment, outer facing layer 102 is made from heavy paper, which can be approximately 90-150 pounds/ream. Other embodiments can employ other paper weights, such as approximately 25 lb./1000 sq. ft.-150 lb./1000 sq. ft, more preferably between about 30 lb./1000 sq. ft.-75 lb./1000 sq. ft., and most preferably the paper material may have a density of about 38 lb./1000 sq. ft. The paper material of printable layer may generally be made with a material having less than 25% airspace, and preferably less than 10% airspace, and most preferably less than 5% airspace. Further, although the outer facing layer 102 may be made of a single sheet, the outer facing layer may also be made of multiple plies.

The outer facing layer 102 can include a printable-clay coated paper. The clay coating in such embodiments is selected to allow the printing with inks to provide designs or text on the formable protector 100. Accordingly, the outer facing layer 102 can include a printable layer, with the printable clay coated, preferably only on the outer side of the paper material, so that it is visible on the exterior of the protector, preferably when in use. The mineral or clay substance coated on the paper material may include, for example, pigments that provide a preselected color to the coating. The percentage of pigment in color component of the coating may be generally from 50%-95% by weight, 70%-95% by weight, or most preferably about 85%-95% by weight. Typically, the particle size of a pigment is less than about 10 μm. Typical minerals used in such coatings may include kaolin clay or calcium carbonate, among various others. As indicated above, such mineral or clay is preferably be receptive to the application of ink or pigments or other substances used in printing, preferably such that when such ink or pigment is applied to the clay, it provides a substrate that fixes the ink or pigment in the manner, form, and shape applied.

As shown in FIG. 1, the formable protector 100 also includes a core layer 104 surrounded by the facing layers 102 and 106. The core layer 104 is preferably designed to resist vertical compression (i.e., compression in a direction between the facing layers 102 and 106 perpendicular to the plane of the formable protector) and can be made from a fiber-based or other suitable material, and is preferably made of paper sheet. In an embodiment, the sandwich construction of the facing layers 102 and 106, along with the core layer 104, can provide a compression strength of approximately 30-200 p.s.i., and more preferably 50-90 p.s.i. Further, the core layer 104 can crush or deform when the formable protector is bent around a sharp shape or feature, e.g., an edge, a protrusion, etc., such as of the object it is protecting.

The sheet of the core 104 is preferably arranged to form upright walls connecting the inner and outer facing layers 102 and 106. Although the walls may be perpendicular to the facing layers 102 and 106, in alternative embodiments, the walls can be disposed at other angles relative to the facing layers 102 and 106. The walls can be arranged in a two-dimensional pattern normal to the inner and outer surfaces of the core layer 104 and to the major surfaces of the inner and outer facing layers 102 and 106. In an exemplary embodiment, the internal structure of the core layer 104 includes a honeycomb, or other structure.

Figure 2:
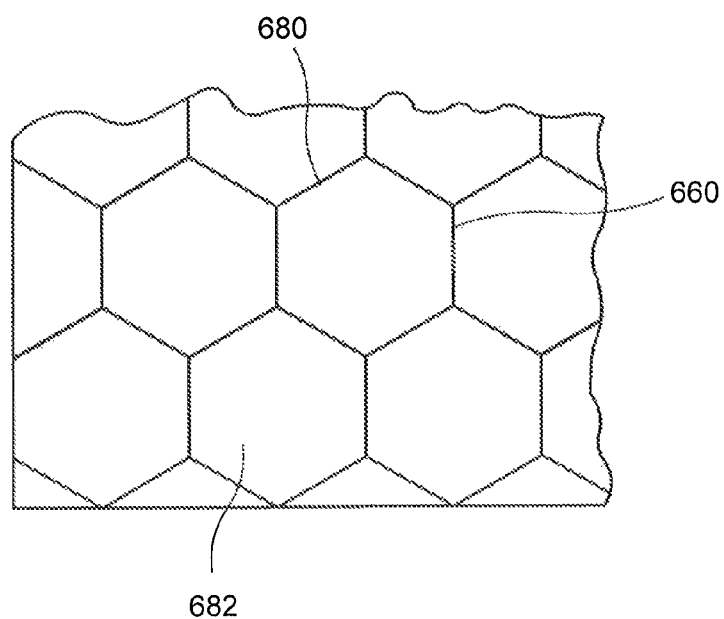
FIG. 2 is a top cross-sectional view showing a portion of the core in accordance with an embodiment of the present disclosure.

Referring now to FIG. 2, and with general reference to the embodiments described, embodiments of a formable protector (e.g., 100, as shown in FIG. 1) in accordance with the present disclosure has a honeycomb core structure 680. The honeycomb structure 680 can have walls 660, defining cells of six walls 660, having a hexagonal shape, an octagonal shape, or other suitable shape, such as 3 or 4-sided shapes. The honeycomb structure 680 can provide for a large number of air spaces 682 within or in between the walls 660 to provide for a low-density honeycomb material that can be mostly air by volume. For example, the panels can comprise a material having over 60%, 70%, or 90% airspace, although any amount of airspace may be acceptable. In other embodiments, a corrugated or other low-density structure may be used in place of the honeycomb structure 680. Other materials may also be used. Alternatively, the structure can have walls that make up any suitable shape. In one embodiment, the honeycomb structure may have a hexagonal shape. In other embodiments, the structure may have a suitable number of walls, making up geometric shapes such as triangles, rectangles, pentagons, octagons, etc. In other embodiments, the walls may be curved or angled. Because of the ease of working with paper materials and the availability of various honeycomb structures, products can be manufactured in a variety of shapes and sizes to meet any particular requirements. Exemplary honeycomb cores which may be used with the formable protector 100 include those which are produced under the Hexacomb® brand by Pregis Corporation.

Adhered to an inner surface of the core layer 104 is an inner facing layer 106. The inner facing layer 106 is flexible and is preferably configured so that it is stretchable, compressible, or both, preferably without tearing. The preferred inner facing layer has an exposed surface that is non-abrasive. When the formable protector is in use, the inner facing layer 106 contacts the object it is protecting. Examples of materials that can be suitable for the inner facing layer 106 include polyethylene foam, non-woven cellulose or polymer fiber, wadded paper, and corrugated paper. In one embodiment, the inner facing layer 106 is made of a polyethylene foam, which is exposed on a surface to contact the object about which the protector is conformed, with a thin paper backing 106a, preferably which is adhered to the core 104, with a suitable adhesive, such as PVA glue, EVA glue, water based adhesives, starch based adhesives, HotMelt®, and solventless adhesives. The inner facing layer 106 is preferably sufficiently flexible and deformable to conform to a shape or feature of the object around which the protector is bent without tearing. This may include an edge, a protrusion, or any non-flat surface that the formable protector 100 may need to conform around. In an embodiment, the inner facing layer 106 is a single continuous sheet that does not include preformed cuts or features that localize a bend in the formable protector 100 at a predetermined location. Preferably, the inner facing layer 106 conforms to the edge and at least partially absorbs and deforms to accommodate the crushed core layer 104 and its deformed two-dimensional pattern as the formable protector is bent around the edge.

Figure 3:
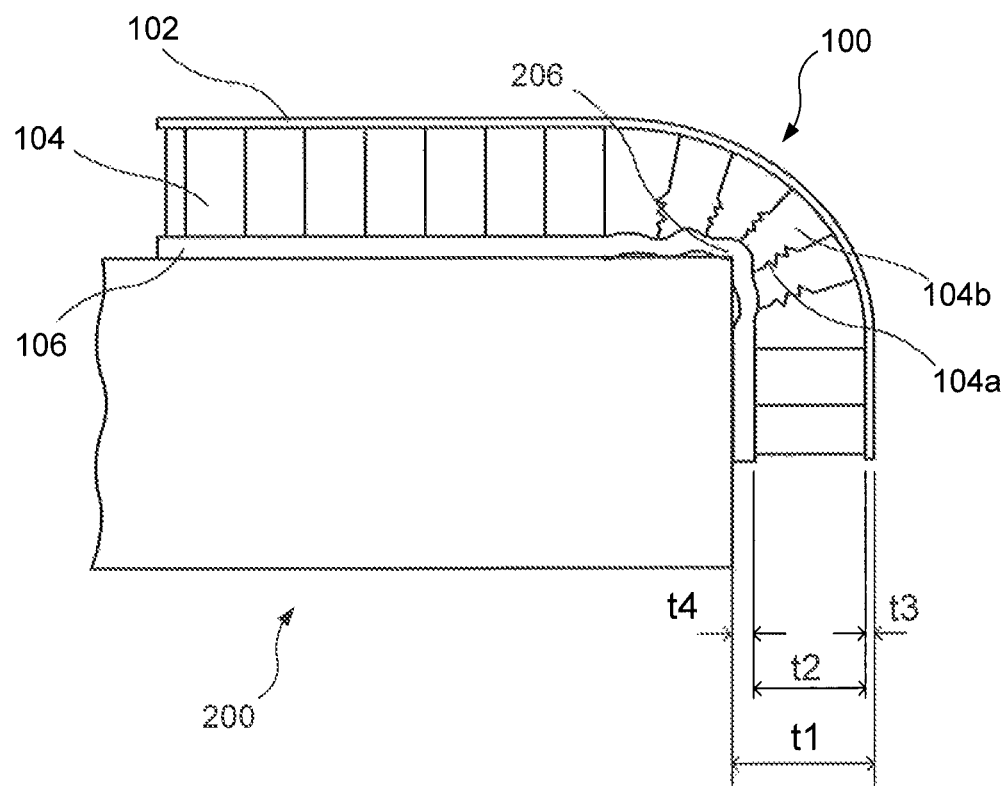
FIG. 3 is a perspective view of a formable protector in use in accordance with an exemplary embodiment of the present disclosure.

FIGS. 3 and 4 show the formable protector 100 drawn over and around edges of an object 200 to be protected, such as, merchandise, packaging of merchandise, electronics, furniture, etc., which is shown on a pallet or base 300. As such, the protector 100 can also be used in situations in which one would desire to employ a honeycomb core having a single facing layer, but an additional, separate protective material would be needed against the an item to protect it from the relatively sharp exposed walls of the honeycomb. Utilizing the protector 100 instead would yield time, and possibly material, savings since two separate protective objects would not need to be separately positioned.

In FIG. 3, the formable protector 100 is drawn over object 200 using straps 202, but other methods can be used to secure the protector 100 to object 200. The dimensions of the protector 100 can be selected to accommodate the size of the object 200. As noted above, the formable protector 100 is preferably substantially continuous, and its layers collectively preferably are free of features that locate and facilitate bending in a predetermined location, and instead configured to conform to irregular shapes and regardless of the specific location of the protector on the object 200. Further, although FIG. 3 shows the formable protector 100 drawn over a rectangular object 200, the formable protector 100 can be placed on top of other objects having various shapes such as cylinders, spheres, pyramidal, triangular, etc.

The upper facing layer 102, core 104, and lower facing layer 106 are affixed together to provide an elevated bending moment of inertia, providing a desired level of stiffness and resistance in bending and twisting. Also, the association of these sandwiched layers help retain the two-dimensional pattern of the core walls, keeping the walls generally upright between the facing layers 102 and 106 so that the core 104 is retained in a position to resist vertical compression of the structure, in a direction compressing the facing layers 102 and 106 towards each other. The typical compression strength of the protector is approximately 30-200 p.s.i., and more preferably about 50-90 p.s.i. In use, the core layer 104 acts as a web of an I-beam and the facing layers 102 and 106 act as the flanges of an I-beam. The inner facing layer 106, however, is preferably less stiff than the outer facing layer 102, and far more stretchable and/or compressible along its major surface, making the structure easier to bend out of plane than with traditional honeycomb sandwiches with plain paper facings top and bottom. For example, the inner facing layer 106 may be at least two times, five times, ten times, or more, more stretchable and/or compressible along its major surface than the outer facing layer 102, in at least one, or in all, directions along the major surface. For instance, the stiffness, and/or maximum strain before breaking or tearing, of the inner facing layer 106 in expansion or compression along its major surface may be at least twice, five times, ten times, or more, higher than of the outer facing layer. Other relative stretchabilities and/or compressibilities of the facing layers 102 and 106 may be used.

In the sandwiched structure 100, the inner facing layer 106 is sufficiently stretchable, compressible, and otherwise deformable to conform to the shape of the edge of the object 200. Since the outer facing layer 102 bends but is substantially unstretchable or far less stretchable than the inner facing layer 106, the outer facing layer 102 resists lateral expansion of the core panel along the outside of the bend, and causes the core to deform, such as by partially crushing, to absorb the curvature of the bent facing 102. The relative unstretchability, or stretching stiffness, of the outer facing layer 102 also contributes to maintaining the integrity of the core layer 104 by preventing the walls making up the structures of the core layer 104 to break the adhesive bond and break away from the outer facing layer 102. The inner facing layer is sufficiently stretchable and/or compressible laterally to absorb the stresses and strains caused by the deformed core 104 without ripping or tearing. As seen in FIG. 4, the inner facing layer 106 can also bend into waves between the walls of the core to help absorb the deformation. It is expected that near the sharp edge 206, the inner facing layer 106 will be compressed, but that if the edge 206 is sharp, as shown in the figure, the portion at the edge 206 itself will be stretched into the partially collapsed core, and the inner facing layer 106 is sufficiently durable and stretchable and/or compressible to avoid tearing about the sharp edge 206 of at least 90° bend, more preferably of at least a 135° bend, and most preferably for about a full 180° bend. It is noted that in an alternative embodiment, both inner and outer layers are made of a stretchable/compressible material, which can provide more symmetrical deformation through the core, rather than localized towards the inner facing layer 106 as in the preferred embodiment.

The sandwiched layers of the protector 100 are preferably configured and associated so the core 104 only partially deforms or crushes to accommodate a bend about a sharp edge 206 of about 90°. The core layer 104 is shown crushing and deforming only in a portion thereof 104a on a side adjacent to the inner facing layer 106, i.e., closer to the edge of the object 200, with the portion 104b on the side closer to the outer facing layer 102 substantially uncrushed. The limited crushing preferably is provided to maintain a significant level of resistance to vertical compression of the core so that, with the formable protector 100 bent, the protector still withstands impacts that could otherwise be damaging to the object 200. For example, the sandwiched layers of the protector 100 may be designed so that the core layer 104 has a minimum crush ratio (i.e., ratio of the amount of crush relative to the original thickness of the core layer) of 10%, 20%, 30%, 40%, or 50%. The sandwiched layers of the protector 100 may also be designed so that the core layer 104 has a maximum crush ratio of 10%, 20%, 30%, 40%, 50%, 70%, or even 100%. Also shown FIG. 4, the bend radius of the outer layer 102 is larger than the bend radius of the inner facing layer 106. Accordingly, the inner layer 106 also compresses in order to compensate for the difference in the bending radii, and the thickness of the protector 100 at the bend can be smaller than the original thickness t1 of the protector 100.

Although the present disclosure has been described with respect to various embodiments, persons skilled in the art will recognize that changes may be made in form and in detail without departing from the spirit and scope of the present disclosure.

As used herein, the terms "front," "back," "inner," "outer," and/or other terms indicative of direction are used herein for convenience and to depict relational positions and/or directions between the parts of the embodiments. It will be appreciated that certain embodiments, or portions thereof, can also be oriented in other positions.

In addition, the term "about" should generally be understood to refer to both the corresponding number and a range of numbers. In addition, all numerical ranges herein should be understood to include each whole integer within the range. While an illustrative embodiment of the invention has been disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. A sandwich construction, comprising:
   a core having inner and outer surfaces and comprising a sheet material oriented extending between the inner and outer core surfaces in a configuration providing resistance to crushing in a direction between the inner and outer surfaces, wherein the core sheet material is a honeycomb structure;
   an outer facing layer of a sheet material adhered to the outer surface of the core layer, wherein the sheet material of the outer facing layer comprises paper sheet; and
   an inner facing layer adhered to the core inner surface and being sufficiently deformable to conform to a sharp edge of a protected object when the sandwich construction is bent therearound, and being substantially more compressible or stretchable than the outer facing layer, wherein the inner facing layer is compressible and stretchable in the plane of the inner facing layer such that the inner facing layer does not tear when the formable protector is bent around the sharp edge;
   wherein the core has sufficient resistance to crushing and the outer facing layer is sufficiently durable for causing the core to partially crush when the sandwich construction is bent around the sharp edge while partially retaining crushing resistance for protecting the sharp edge against impact.

2. The sandwich construction of claim 1, wherein the inner facing layer is substantially less stiff than the outer facing layer in compression or extension.

3. The sandwich construction of claim 1, wherein the core sheet material is configured in a two-dimensional pattern normal to the inner and outer surfaces.

4. The sandwich construction of claim 1, wherein the sheet material of the core comprises paper sheet.

5. The sandwich construction of claim 1, wherein the outer facing layer includes a printable-clay coated paper.

6. The sandwich construction of claim 1, wherein the inner facing layer is sufficiently deformable for conforming to the core crushed about the sharp edge to at least half the core depth without tearing.

7. The sandwich construction of claim 1, wherein the inner facing layer is sufficiently deformable for conforming to the core without tearing when the core is completely crushed about the sharp edge.

8. The sandwich construction of claim 1, wherein the inner facing layer is at least one of sufficiently compressible or sufficiently stretchable for conforming to the core without tearing when the core is at least partially crushed about the sharp edge.

9. The sandwich construction of claim 1, wherein the inner and outer facing layers are substantially continuous.

10. The sandwich construction of claim 1, wherein the inner facing layer includes wadded paper.

11. The sandwich construction of claim 1, wherein the inner facing layer includes a foam layer.

12. The sandwich construction of claim 1, wherein the sandwich construction includes a formable protector.

13. A formable protector, comprising:
    a honeycomb core having inner and outer surfaces and comprising a sheet material oriented extending between the inner and outer core surfaces in a configuration providing resistance to crushing in a direction between the inner and outer surfaces, wherein the resistance to crushing is between about 50 psi and about 90 psi;
    an outer facing layer of a substantially unstretchable paper sheet material adhered to the outer surface of the core layer; and
    an inner facing layer adhered to the core inner surface and being sufficiently stretchable to conform to a sharp edge of a protected object when the formable protector is bent therearound, wherein the inner facing layer comprises either a polymer fiber material or a wadded paper material, such that the inner facing layer is compressible and stretchable in the plane of the inner facing layer;
    wherein the core has sufficient resistance to crushing and the outer facing layer is sufficiently durable for causing the core to partially crush when the formable protector is bent around the sharp edge while partially retaining crushing resistance for protecting the sharp edge against impact.

14. The formable protector according to claim 13, wherein the inner and outer facing layers are substantially continuous.

15. The formable protector according to claim 13, wherein the inner facing layer includes a foam layer.

16. The formable protector of claim 13, wherein the inner facing layer is sufficiently deformable for conforming to the core crushed about the sharp edge to at least half the core depth without tearing.

17. The formable protector of claim 13, wherein the inner facing layer is sufficiently deformable for conforming to the core without tearing when the core is completely crushed about the sharp edge.

18. The formable protector of claim 13, wherein the inner facing layer is substantially more compressible and stretchable than the outer facing layer.

* * * * *